(12) United States Patent
Sharma

(10) Patent No.: US 6,882,481 B2
(45) Date of Patent: Apr. 19, 2005

(54) OPTICAL ARRANGEMENT FOR HIGH POWER MICROOBJECTIVE

(75) Inventor: Keshav D. Sharma, Lancaster, NY (US)

(73) Assignee: Leica Microsystems Inc., Depew, NY (US)

(*) Notice: Subject to any disclaimer, the term of this patent is extended or adjusted under 35 U.S.C. 154(b) by 0 days.

(21) Appl. No.: 10/614,638

(22) Filed: Jul. 7, 2003

(65) Prior Publication Data

US 2005/0007676 A1 Jan. 13, 2005

(51) Int. Cl.⁷ .............................................. G02B 21/02
(52) U.S. Cl. ..................................... 359/656; 359/657
(58) Field of Search ................................. 359/656–657

(56) References Cited

U.S. PATENT DOCUMENTS

| | | | | |
|---|---|---|---|---|
| 5,502,596 A | * | 3/1996 | Suzuki | 359/657 |
| 5,517,360 A | * | 5/1996 | Suzuki | 359/658 |
| 5,530,590 A | * | 6/1996 | Saito | 359/658 |
| 5,532,878 A | * | 7/1996 | Suenaga et al. | 359/657 |
| 5,659,425 A | * | 8/1997 | Suzuki | 359/658 |
| 5,739,958 A | * | 4/1998 | Abe | 359/660 |
| 5,898,524 A | * | 4/1999 | Ryzhikov | 359/657 |
| 6,501,603 B1 | * | 12/2002 | Kasahara | 359/656 |
| 6,519,092 B1 | * | 2/2003 | Yamaguchi | 359/656 |
| 6,747,804 B1 | * | 6/2004 | Fujimoto et al. | 359/656 |
| 6,822,805 B1 | * | 11/2004 | Kurata | 359/656 |
| 2003/0043473 A1 | * | 3/2003 | Okuyama | 359/659 |

OTHER PUBLICATIONS

Sharma, K.D., "High power microobjective: a new design." Applied Optics, vol. 24, No. 16, Aug. 15, 1985, pp. 2577–2580.

* cited by examiner

*Primary Examiner*—Evelyn A. Lester
(74) *Attorney, Agent, or Firm*—Simpson & Simpson, PLLC

(57) ABSTRACT

An arrangement of lenses for a 100×, oil immersion microscope objective is presented. The new configuration gives a flat field of view with diffraction limited performance over all the field. The new optical arrangement broadly includes eight lens elements including a positive power seventh lens element with the radius of curvature of the surface proximate to the object plane less than or approximately equal to the radius of curvature of the surface distal to the object plane, with the optical arrangement arrayed such that the distance from the first lens element to the second lens element is sufficient to reduce a ray height of a light ray and, in addition, arrayed such that the distance from the fifth lens element to the sixth lens element is sufficient to increase the ray height of the light ray entering the sixth lens element from the ray height of the light ray entering the first lens element.

22 Claims, 3 Drawing Sheets

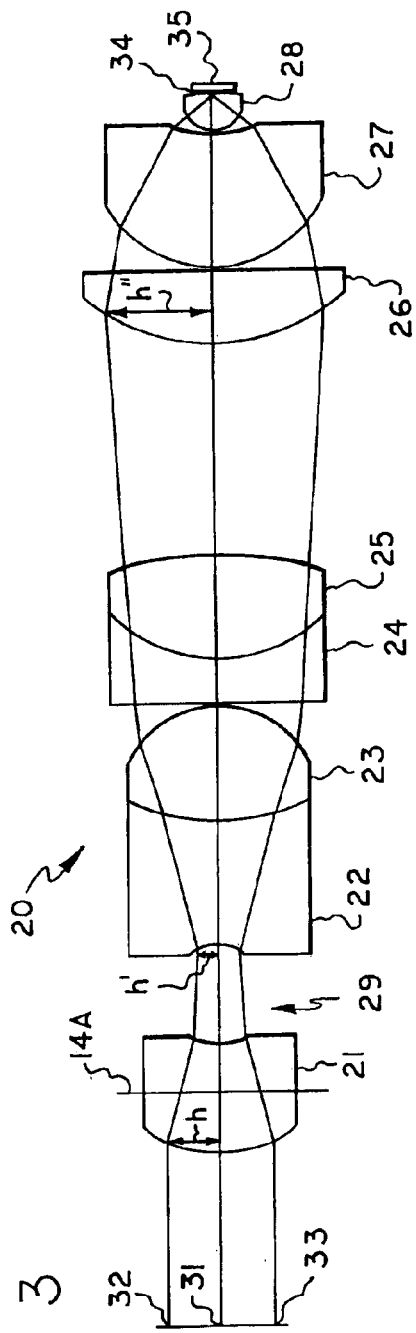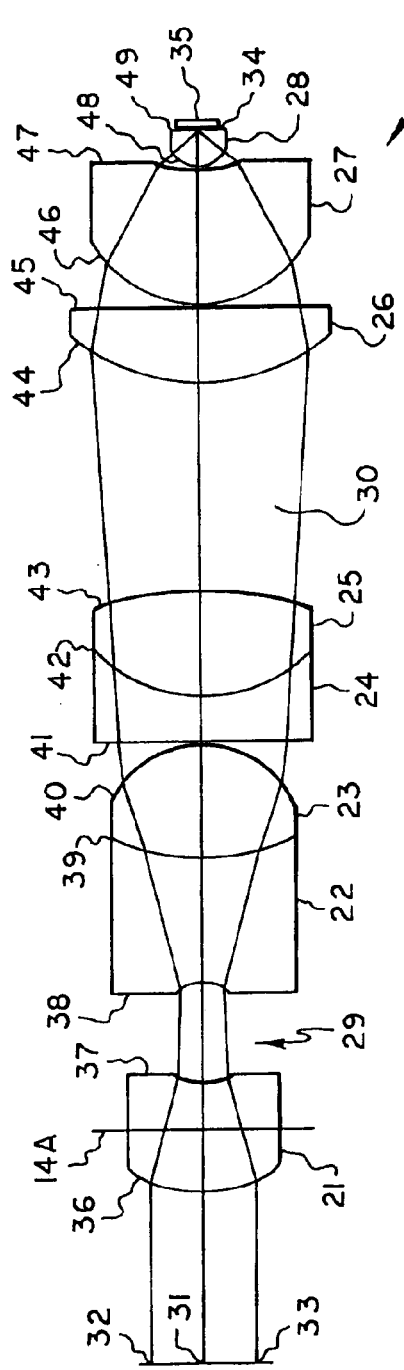
FIG. 3
FIG. 4

OPTICAL ARRANGEMENT FOR HIGH POWER MICROOBJECTIVE

FIELD OF THE INVENTION

The present invention relates generally to compound microscopes and to those instruments which use the same or similar optical arrangements found in a conventional compound microscope.

BACKGROUND

As is well known, a microscope is an optical instrument used to view, examine and study very fine details of an object. The most critical component of the microscope is the microscope objective. The magnifying power and the resolution of the fine details of objects being examined are mainly dependent on the objective characteristics.

One of the common defects of the microscope objective is the lack of correction of field curvature. This arises from the fact that the majority of lens elements in a microscope objective have positive power, which in turn have inward curving fields. The inward curving field is to some extent offset by the use of negative lenses, which contribute outward curving field curvature and are required for correction of other aberrations, such as spherical aberration, astigmatism, distortion, coma, and chromatic aberration. However, since the overall power of the objective is positive, in normal achromat designs, the field of view retains an inward curvature. This inward curvature permits a clear image of an object under study only in the center of the field of view while objects at the periphery of the field are blurred. This problem was addressed to some extent by K. D. Sharma in *Applied Optics*, vol. 24, p. 2577 in an article entitled "High Power Microobjective: A New Design" which article is hereby incorporated by reference. The article discusses an arrangement of lenses where a negative lens helps to flatten the curvature of the field of view. However, the design in the article is limited in performance in terms of aberration correction.

What is needed then is an optical arrangement of lenses that meets the requirements of magnification and numerical aperture (NA), that has a flat field and that approaches diffraction limited performance.

SUMMARY OF THE INVENTION

The present invention relates to the design of a high power microscope objective generally used on a compound microscope. The invention discloses a new arrangement of lenses, comprising eight lens elements, which provide correction to the field curvature along with other aberrations. This simple arrangement is capable of approaching and in some cases providing diffraction limited performance over the entire field of view.

The new optical arrangement broadly comprises a first lens element having at least one first lens, the first lens element having a positive power, with the radius of curvature of the surface of the first lens element proximate to an object plane less than or approximately equal to the radius of curvature of the surface of the first lens element distal to the object plane, a second lens element having at least one second lens, the second lens element having a negative power, a third lens element having at least one lens, the third lens element having positive power, a fourth lens element having at least one lens, the fourth lens element having a negative power, a fifth lens element having at least one lens, the fifth lens element having a positive power, a sixth lens element having at least one lens, the sixth lens element having a positive power, a seventh lens element having at least one lens, the seventh lens element having a positive power, with the radius of curvature of the surface of the seventh lens element proximate to the object plane less than or approximately equal to the radius of curvature of the surface of the seventh lens element distal to the object plane, and an eighth lens element having at least one lens, the eighth lens element having a positive power, with the optical arrangement arrayed such that the distance from the first lens element to the second lens element is sufficient to reduce a ray height of a light ray entering the second lens element from the ray height of the light ray entering the first lens element and, in addition, arrayed such that the distance from the fifth lens element to the sixth lens element is sufficient to increase the ray height of the light ray entering the sixth lens element from the ray height of the light ray entering the first lens element.

An object of the invention is to reduce the inward field curvature of the viewing area of a high power optical arrangement.

An additional object of the invention is to present an optical arrangement with a high level of aberration correction.

A further objective is to provide an optical arrangement in which Strehal ratios are approximately equal to or greater than 0.8 over the entire field of view.

BRIEF DESCRIPTION OF THE SEVERAL VIEWS OF THE DRAWINGS

The nature and mode of the operation of the present invention will now be more fully described in the following detailed description of the invention taken with the accompanying drawing Figures, in which:

FIG. 3 is a schematic view of a preferred embodiment of the optical arrangement of the present invention demonstrating the path of light rays transmitted through the optical arrangement;

FIG. 4 is a schematic view of a preferred embodiment of the optical arrangement of the present invention similar to FIG. 3 depicting the surfaces of the lens elements of the present invention; and, FIG. 5 is a graphic presentation of Optical Path Difference curves for monochromatic light at different points in the field of view.

DETAILED DESCRIPTION OF THE INVENTION

At the outset, it should be appreciated that like drawing numbers on different drawing views identify identical structural elements of the invention.

While the present invention is described with respect to what is presently considered to be the preferred embodiments, it is understood that the invention is not limited to the disclosed embodiments. The present invention is intended to cover various modifications and equivalent arrangements included within the scope of the appended claims.

In the detailed description of the invention, the following definitions apply:

Strehal Ratio is the ratio of the peak intensity in the diffraction pattern of an aberrated point image to the peak intensity in the diffraction pattern of the point image without aberrations. A high Strehal ratio indicates a high level of aberration correction.

Petzval Curvature is a basic field curvature associated with an optical system.

Diffraction limited describes an optical system in which the resolution of the image is determined only by the effects of diffraction and not by lens aberrations. Generally, an acceptable diffraction limited system has a Strehal ratio of 0.80 or greater. An ideal optical system will have no aberrations and have a Strehal ratio of 1.0.

Positive power is a characteristic of some lenses in which light rays entering the lens are refracted toward the optical axis of the lens.

Negative power is a characteristic of some lenses in which light rays entering the lens are refracted away from the optical axis of the lens.

Ray height is the vertical distance from the optical axis to the point on a lens surface where a particular light ray enters a lens.

Vignetting is the gradual reduction of image illuminance with an increasing off-axis angle, resulting from limitations of the clear apertures of elements within an optical system.

Figure 1:
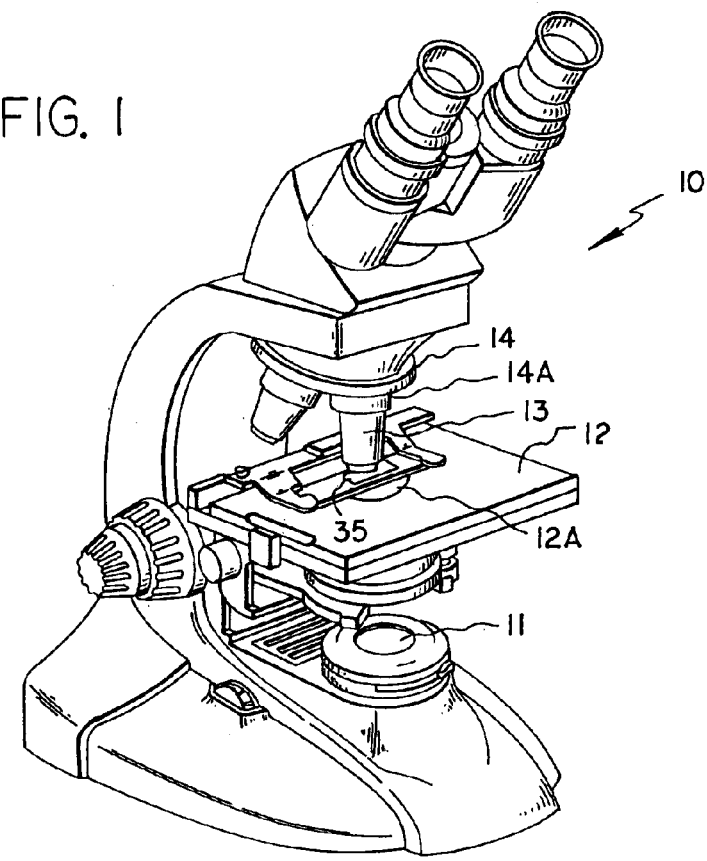
FIG. 1 is a perspective view of a typical compound microscope with which the optical arrangement of the present invention is adaptable for use.

Adverting to the drawings, FIG. 1 depicts compound microscope 10 having a light source 11 illuminating an aperture 12A in stage 12. Cover slip 35 covers an object being studied (not shown). Objective 13 is attached to nosepiece 14 at attachment point 14A. Objective 13 is positioned so as to transmit light from light source 11 through the aperture and cover slip 35 to the nosepiece 14 after the light illuminates the object being studied. Although light source 11 shown in FIG. 1 illuminates the object directly, it should be understood that the object may be illuminated by indirect illumination such as by the use of mirrors to reflect light from a light source through the object being studied to objective 13.

Figure 2A:
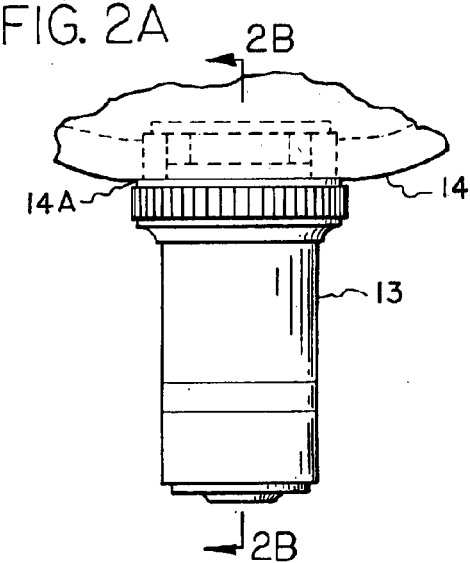
FIG. 2A is a front view of an objective of the compound microscope of FIG. 1.
Figure 2B:
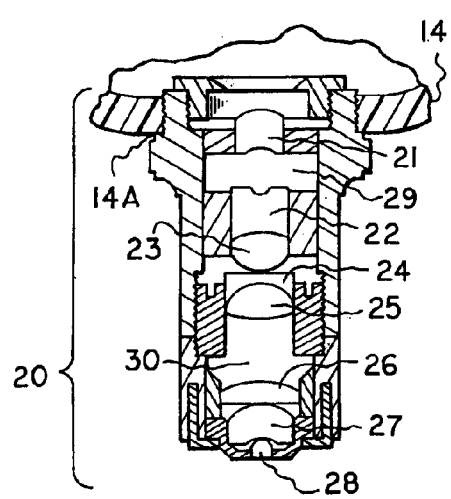
FIG. 2B is a cross-section of the microscope objective taken along line 2B—2B in FIG. 2A.

FIG. 2A is a front view of objective 13 of compound microscope 10. The shaded area in FIG. 2A indicates the portion of optical arrangement 20 that extends above attachment point 14A. FIG. 2B depicts a cross-section of objective 13 taken along line 2B—2B of FIG. 2A containing optical arrangement 20 of the instant invention. First lens element 21 is located proximate to nosepiece 14. In a preferred embodiment, first lens element 21 extends above attachment point 14A. Because of its thickness, first lens element 21 has positive power. In a preferred embodiment, first lens element 21 has a high index of refraction. In a more preferred embodiment, first lens element 21 has an index of refraction above about 1.7. In a still more preferred embodiment, first lens element 21 has a refractive index above about 1.8. In a still more preferred embodiment, first lens element 21 has a thickness of about 5 mm. In first lens element 21, the radius of curvature of the surface distal to the object (not shown in FIG. 2B) is greater than the surface proximal to the object. This configuration produces a negative contribution toward the Petzval Curvature of optical arrangement 20, greatly contributing to a flatter field of view. The high index of refraction helps to reduce spherical aberration and to decrease the Petzval Curvature of optical arrangement 20. The thickness of first lens element 21 contributes to a reduction in ray height of the light rays entering and exiting first lens element 21. Persons skilled in the art will recognize that more than one lens may comprise first lens element 21 provided that the individual lenses combine to have a positive power and, preferably, a high index of refraction, and, more preferably, surface curvatures in which the radius of curvature of the surface distal to the object is greater than the surface proximal to the object.

Second lens element 22 is depicted in FIG. 2B. Gap 29 is a relatively large space between first lens element 21 and second lens element 22. Second lens element 22 has negative power which contributes to the reduction of the Petzval Curvature of optical arrangement 20. As is well known in the art, a reduction in the Petzval Curvature of an optical system or arrangement reduces the field curvature of an optical system and thus acts to flatten the viewing fields of an optical system. In a preferred embodiment, gap 29 is between about 4–5 mm. In a more preferred embodiment, gap 29 is between about 4.5–4.6 mm. Because of the length of gap 29, the ray heights of the light rays entering second lens element 22 are lower than the ray heights of the same light rays entering first lens element 21. Using the formula $\Phi=hk$, where $\Phi$ is effective lens power, h is ray height and k is actual lens power, it can be seen that as the ray height is reduced, the effective lens power will be reduced. In the case of second lens element 22, a reduced ray height will decrease the effective negative lens power of second lens element 22 thereby reducing the negative contribution of second lens element 22 to the overall effective power of optical arrangement 20. Because Petzval Curvature is independent of ray height, the negative contribution of second lens element 22 to the Petzval Curvature of optical arrangement 20 is not diminished by a decrease in ray height or by the effective negative power of second lens element 22. However, it is well known in the art that as the ray height of a light ray approaches zero, it becomes increasingly difficult to correct for optical aberrations. Preferably, the ray height of a light ray entering second lens element 22 is not reduced below 40% of the ray height of the same light ray as it enters first lens element 21 in optical arrangement 20 of the present invention. Persons skilled in the art will recognize that more than one lens may comprise second lens element 22 provided that all lenses comprising second lens element 22 together have negative power and make a negative contribution to the Petzval Curvature of optical arrangement 20 of the instant invention.

Third lens element 23 is depicted in FIG. 2B. Third lens element 23 has positive power and therefore acts to reduce the angle of divergence of the light as it passes through third lens element 23. In a preferred embodiment, second lens element 22 and third lens element 23 have widely differing V-numbers (Abbe numbers) which aids in correcting the color aberration of optical arrangement 20. In a more preferred embodiment, the V-numbers of second lens element 22 and third element 23 will differ by a value of about 30 or greater. In an even more preferred embodiment, the V-numbers of second lens element 22 and third element 23 will differ by a value of about 50 or greater. In a most preferred embodiment, second lens element 22 and third lens element 23 will be fixedly attached using Norland Optical Adhesive Grade 61 or equivalent to form a negative doublet as seen in FIG. 2B. Persons skilled in the art will recognize that more than one lens may comprise third lens element 23 provided all lenses comprising third lens element 23 together combine to have positive power and V-numbers that differ from the V-number of second lens element 22 by a value of 30 or greater.

Fourth lens element 24 is shown in FIG. 2B. Fourth lens element 24 has negative lens power. Because of its negative power, fourth lens element 24 acts to diverge entering light rays, thereby making a negative contribution to the Petzval Curvature of optical arrangement 20. Fifth lens element 25 is also shown in FIG. 2B and has positive power. Preferably fourth lens element 24 and fifth lens element 25 have widely differing V-numbers and refractive indices to achieve good color correction. In a preferred embodiment, the V-numbers of fourth lens element 24 and fifth lens element 25 differ by about 45. In a more preferred embodiment, the refractive index of fourth lens element 24 is at least about 1.55. In an even more preferred embodiment, fourth lens element 24 has a refractive index greater than about 1.65. In a most preferred embodiment, fourth lens element 24 and fifth lens element 25 will be fixedly attached using Norland Optical Adhesive Grade 61 or equivalent to form a positive doublet as seen in FIG. 2B. The positive doublet decreases the divergence of the ray caused by second lens element 22 or the negative doublet discussed above that is formed by second lens element 22 and third lens element 23. Persons skilled in the art will recognize that more than one lens may comprise fourth lens element 24 provided all lenses comprising fourth lens element 24 together combine to have negative power and make a negative contribution to the Petzval Curvature of optical arrangement 20 of the instant invention. Persons skilled in the art will recognize that more than one lens may comprise fifth lens element 25 provided all lenses comprising fifth lens element 25 together combine to have positive power and possess V-numbers that differ from the V-number of fourth lens element 24 by a value of 30 or greater.

Sixth lens element 26 is shown in FIG. 2B. Sixth lens element 26 has positive power and is located after gap 30. As discussed below, after fifth lens element 25 or the positive doublet mentioned above, the light ray is still diverging and because of the relatively large distance created by gap 30, it strikes sixth lens element 26 at a relatively large ray height compared to the ray height entering first lens element 21. In a preferred embodiment, gap 30 is between about 9.5 and 10 mm. In a more preferred embodiment, gap 30 is between about 9.7 and 9.8 mm. Based on the formula above, $\Phi=hk$, it can be seen that as the ray height is increased, the effective lens power will be increased. Therefore, a lens with relatively low actual positive power will generate a larger effective positive power when light rays of increasing ray height strike a low power positive lens. In such an optical system, an increase in effective positive power will make a relatively large contribution to the total power of an optical system relative to the actual positive power of the lens. In addition, because Petzval Curvature is independent of ray height, the relatively low actual positive power of sixth lens element 26 will make only a relative low positive contribution to the Petzval Curvature of optical arrangement 20. Persons skilled in the art will recognize that more than one lens may comprise sixth lens element 26 provided all lenses comprising sixth lens element 26 together combine to have positive power.

Seventh lens element 27 is shown in FIG. 2B. Seventh lens element has positive power because of its thickness, while the radius of curvature of the surface distal to the object (not shown in FIG. 2B) is greater than the surface proximal to the object. This configuration produces a negative contribution toward the Petzval Curvature of optical arrangement 20, greatly contributing to a flatter field of view. Persons skilled in the art will recognize that more than one lens may comprise seventh lens element 27 provided that the individual lenses combine to have a positive power and, preferably, surface curvatures in which the radius of curvature of the surface distal to the object is greater than the surface proximal to the object.

Eighth lens element 28 is seen in FIG. 2B. Preferably eighth lens element 28 is a hyperhemispherical lens which is suitable for use with immersion oil of the type used in high power (100×) microobjectives such as in the present invention. Because of its long radius and relatively high refractive index, the positive contribution of eighth lens element 28 to the Petzval Curvature of optical arrangement 20 is relatively low.

FIG. 3 is a schematic representation of a preferred embodiment of optical arrangement 20 demonstrating the path of light rays 32 and 33 passing through optical arrangement 20 of the present invention. Optical axis 31 is also depicted. Ray height for light ray 32 entering first lens element 21 is shown as h, while ray height of light ray 32 as it enters second lens element 22 is shown as h'. As defined above, ray height is the vertical distance from the optical axis to the point on a lens surface where a particular light ray enters a lens. In optical arrangement 20 of the current invention, ray height h is greater than ray height h'. As can be seen in FIG. 3, as light rays 32 and 33 enter first lens element 21, which has positive power, they converge toward optical axis 31 as they pass through first lens element 21. Light rays 32 and 33 continue to converge toward optical axis 31 after they exit from first lens element 21 and pass through gap 29 to second lens element 22. Consequently, as gap 26 increases ray height h' at the entrance point on second lens element 22 will decrease.

Second lens element 22, having negative power, causes the light rays 32 and 33 to diverge away from optical axis 31 while giving rise to a negative contribution to the total Petzval Curvature of optical arrangement 20. As light rays 32 and 33 pass into and out of third lens element 23, which has positive power, they diverge from optical axis 31 to a lesser degree than in second lens element 22. As shown in FIG. 3, in a preferred embodiment, second lens element 22 and third lens element 23 are joined together to form a negative doublet. Such a doublet can be formed using optical cement such as Norland Optical Cement 61. The glasses used for second lens element 22 and third lens element 23 preferably have widely differing V-numbers (Abbe values) which allows for color correction and also helps to avoid steep curvatures in the doublet.

As light rays 32 and 33 pass into and out of fourth lens element 24, which has negative power, they diverge from optical axis 31 while creating a negative contribution to the total Petzval Curvature of optical arrangement 20. As light rays 32 and 33 pass into and out of fifth lens element 25 which has positive power, they diverge to a lesser degree than in fourth lens element 24. In a preferred embodiment, fourth lens element 24 and fifth lens element 25 are joined together to form a positive doublet. Such a doublet can be formed using optical cement such as Norland Optical Cement 61 or an equivalent. The glasses used for fourth lens element 24 and fifth lens element 25 preferably have widely differing V-numbers which allows for color correction and also helps to avoid steep curvatures in the doublet similar to the negative doublet formed by second lens element 22 and third lens element 23.

As seen in FIG. 3, light rays 32 and 33 continue to diverge from optical axis 31 after emerging from fifth lens element 25 and passing through gap 30 to sixth lens element 26. As discussed above, the diverging light rays 32 and 33 strike sixth lens element 26 at a ray height h" which is larger than the ray height h of rays 32 and 33 entering first lens element 21. Preferably, the ray height h" is approximately twice as high as ray height h. The increase in ray height causes an increase in the effective positive power of sixth lens element 26 thereby increasing the overall effective power of optical arrangement 20. Simultaneously, because sixth lens element 26 has a relatively low actual positive power, it makes a relatively low positive contribution to the overall Petzval Curvature of optical arrangement 20.

The positive power of sixth lens element 26 causes light rays 32 and 33 to converge toward optical axis 31. This convergence continues as seen in FIG. 3 as light rays 32 and 33 enter and exit seventh lens element 27. Seventh lens element 27 is configured to possess sufficient thickness to have positive power and a larger radius of curvature for the surface distal to the object than the surface proximal to the object. As described above, such a decrease in radius of curvature from the distal surface to the proximal surface produces a negative contribution to the Petzval Curvature of optical arrangement 20 thereby contributing to a flat field of view, while the positive power of seventh lens element 27 contributes to the overall positive power of optical arrangement 20.

Eighth lens element 28 has a positive power and is preferably hyperhemispherical in shape having a relatively long radius. Preferably, eighth lens element 28 has a high refractive index. Because of the combination of the long radius and the high refractive index, the positive contribution of eighth lens element 28 to the overall Petzval Curvature of optical arrangement 20 is low. Immersion oil 34 fills the cavity between the eighth lens element 28 and cover glass 35 over the object. Immersion oil 34 has a refractive index between the refractive indices of the eighth lens element 28 and cover slip 35 which helps to reduce reflection losses and increase the numerical aperture. Cover slip 35 has two flat surfaces perpendicular to optical axis 31 and is positioned proximate to the object plane in relation to the lens elements described above. A preferred embodiment of optical arrangement 20 of the current invention is given in the example below.

EXAMPLE

A preferred embodiment of the above described optical arrangement 20 is seen in the assembly of lens elements listed below in Table I and depicted in FIG. 4. Surface Number refers to the surface of each lens through which optical axis 31 passes. For example, first lens element 21 comprises surface 36 and surface 37. Radius of curvature is one-half the diameter of a sphere defining the convex or concave surface of a lens. A surface having a radius of curvature of infinity indicates the surface is flat or planar. Separation refers to the distance between the lens surfaces as measured along optical axis 31. For example, as seen in Table I, the separation between surface 36 and surface 37 is 4.9991 mm indicating first lens element 21 is 4.9991 mm thick along optical axis 31. The distance between surface 37 and surface 38 is 4.5744 mm indicating gap 29 is 4.5744 mm wide between surface 37 of first lens element 21 and surface 38 of second lens element 22 as measured along optical axis 31. Clear diameter is the clear aperture of an optical component measured in millimeters that controls the amount of light incident on a given surface. The optical glasses listed are Schott Glass types of optical glasses manufactured by Schott Glass Technologies. As depicted in FIG. 4, reference number 14A is the attachment point of objective 13 to microscope 10 as seen in FIGS. 1, 2A, and 2B.

TABLE I

| Lens Element | Surface No. | Radius of Curvature | Separation (in mm.) | Clear Diameter | Schott Glass |
|---|---|---|---|---|---|
|  | 14A | infinity | −2.7898 | 5.08 |  |
| 21 | 36 | 5.936084 | 4.9991 | 5.20 | SFL57 |
|  | 37 | 5.077138 | 4.5744 | 3.07 |  |
| 22 | 38 | −1.821953 | 5.7338 | 2.13 | SFL57 |
| 23 | 39 | 8.9337 | 4.9624 | 5.45 | N-FK51 |
|  | 40 | −4.679245 | 0.0499 | 7.65 |  |
| 24 | 41 | 77.58103 | 1.9936 | 7.94 | SF5 |
| 25 | 42 | 6.375041 | 4.8393 | 8.07 | N-FK51 |
|  | 43 | −15.51697 | 9.7941 | 8.79 |  |
| 26 | 44 | 9.925674 | 3.0000 | 10.07 | N-PSK57 |
|  | 45 | 73.32433 | 0.0500 | 9.44 |  |
| 27 | 46 | 5.809166 | 5.8622 | 8.57 | N-LASF44 |
|  | 47 | 5.209411 | 0.0500 | 3.66 |  |
| 28 | 48 | 1.277184 | 1.6109 | 2.51 | N-PSK3 |
|  | 49 | infinity | 0.160 | 0.96 | OIL |
| N/A | 50 | infinity | 0.170 | 0.49 | COVER |
|  | 51 | Infinity | N/A | 0.20 | K5 |

The design depicted schematically in FIG. 4 uses the lenses listed in Table I and is optimized for an infinite conjugate, a focal length of 2 mm, a numerical aperture of 1.25, and a field size of 0.2 mm. in the object plane. When used with a tele lens of 200 mm effective focal length (efl), optical arrangement 20 will give a magnification of 100× and cover a field of view of 20 mm in the eyepiece focal plane. The vignetting is controlled by restricting the clear aperture of the first surface to 5.0 mm. This is the minimum requirement to achieve a numerical aperture of 1.25

The performance of the design is evaluated by calculating the Strehal ratio. The Strehal ratio values are given in Table II for monochromatic light at a wavelength of 0.5461 microns (e-line) as well for polychromatic light at four different fields, namely full (0.10 mm), 0.071 (zonal), half (0.050 mm), and on axis (0.00 mm). To represent polychromatic light, five wavelengths have been used. These wavelengths in microns are 0.48, 0.51, 0.5461, 0.59, and 0.644. The respective color weights for these wavelengths are taken as 0.3, 0.6, 1.0, 0.6, and 0.3. As can be seen from Table II, the Strehal ratio values at different fields for monochromatic light are between 0.946 and 0.803. The Strehal ratio values for polychromatic light are between 0.852 and 0.762. A value of 0.80 represents a diffraction limited system. The results shown in Table II are above the diffraction limit for monochromatic light and exceed the diffraction limit for polychromatic light except at the edge of the field. These results indicate that the design described above has a very high level of aberration correction and results in an extremely flat field over the whole field of view.

TABLE II

| | Strehal Ratio | | |
|---|---|---|---|
| Field Number. | Half Field Size (in mm) | Monochromatic Strehal Ratio | Polychromatic Strehal Ratio |
| 1 | 0.000 | 0.946 | 0.846 |
| 2 | 0.050 | 0.877 | 0.852 |
| 3 | 0.071 | 0.834 | 0.827 |
| 4 | 0.100 | 0.803 | 0.762 |

Figure 5:
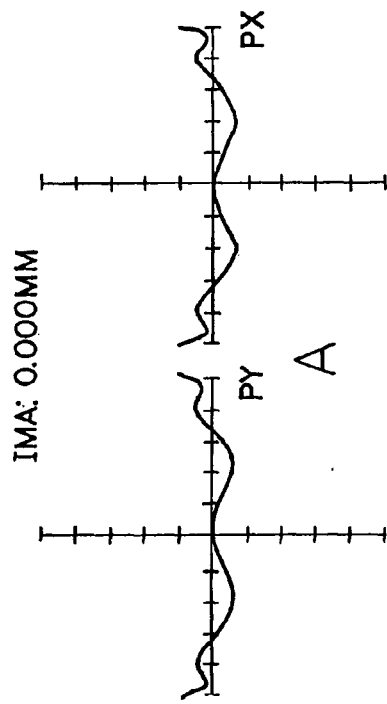
Figure 5:
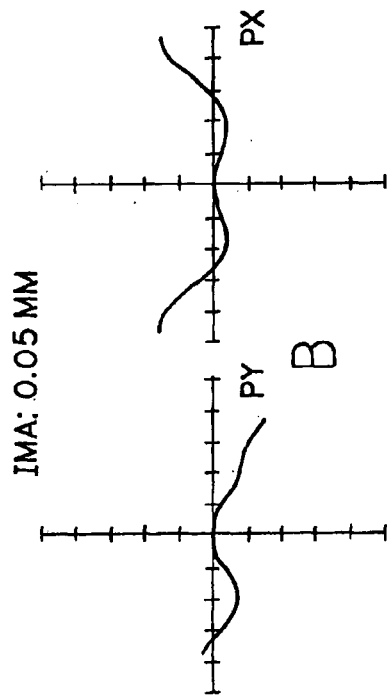
Figure 5:
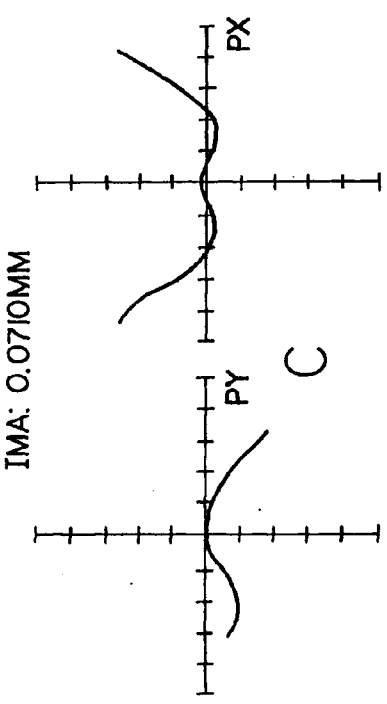
Figure 5:
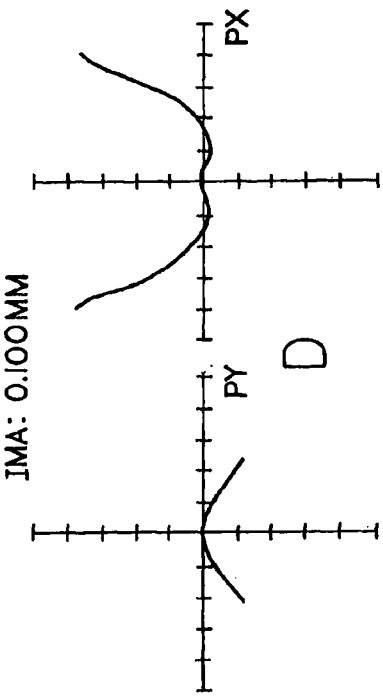

In addition, a plot of Optical Path Difference curves is shown for the e-line in FIG. 5. These curves indicate that the residuals of the wave front aberration are very small for the entire field. (Each scale mark in FIG. 5 is for 0.1 wave.) FIG. 5A shows that on axis (0.0 field size), the wave front aberration is only 0.1 waves. Wave front aberration in FIGS. 5B (0.050 half field), 5C (0.071 zonal field) and 5D (0.100 full field) is approximately 0.4 wave. These curves demonstrate the design is well corrected over the entire field of view and corroborates the results shown from the Strehal Ratio analysis.

As described above, it is noted that the optical glasses listed in Table I are selected for correction of aberrations such as spherical aberration, coma, astigmatism, Petzval Curvature, distortion, and chromatic aberrations. Persons skilled in the art will recognize that other optical glasses with similar properties may be used in optical arrangement 20 to obtain a flattened field while still achieving a high correction of optical aberrations in a high power (100×) microobjective.

I claim:

1. An optical arrangement comprising:
   a first lens element having at least one first lens, said first lens element having a positive power, and wherein the radius of curvature of the surface of said first lens element proximate to an object plane is less than or approximately equal to the radius of curvature of the surface of said first lens element distal to said object plane;
   a second lens element having at least one second lens, said second lens element having a negative power;
   a third lens element having at least one lens, said third lens element having positive power;
   a fourth lens element having at least one lens, said fourth lens element having a negative power;
   a fifth lens element having at least one lens, said fifth lens element having a positive power;
   a sixth lens element having at least one lens, said sixth lens element having a positive power;
   a seventh lens element having at least one lens, said seventh lens element having a positive power, and wherein the radius of curvature of the surface of said seventh lens element proximate to said object plane is less than or approximately equal to the radius of curvature of the surface of said seventh lens element distal to said object plane; and,
   an eighth lens element having at least one lens, said eighth lens element having a positive power,
   wherein the distance from said first lens element to said second lens element is sufficient to reduce a ray height of a light ray entering said second lens element from the ray height of said light ray entering said first lens element and wherein the distance from said fifth lens element to said sixth lens element is sufficient to increase said ray height of said light ray entering said sixth lens element from the ray height of said light ray entering said first lens element.

2. The optical arrangement according to claim 1 wherein said reduction in ray height is less than or equal to about 40%.

3. The optical arrangement according to claim 1 wherein said increase in ray height is less than or equal to about 200%.

4. The optical arrangement according to claim 1, wherein said first lens element has a refractive index of at least about 1.55.

5. The optical arrangement according to claim 1 wherein the V-number of said second lens element differs from the V-number of said third lens element by at least about 30.

6. The optical arrangement according to claim 1, wherein said second lens element is fixedly attached to said third lens element.

7. The optical arrangement according to claim 1, wherein said fourth lens element has a refractive index of at least about 1.55.

8. The optical arrangement according to claim 1 wherein the V-number of said fourth lens element differs from the V-number of said fifth lens element by at least about 30.

9. The optical arrangement according to claim 1, wherein said fourth lens element is fixedly attached to said fifth lens element.

10. The optical arrangement according to claim 1 wherein said eighth lens element has a hyperhemispherical shape.

11. The optical arrangement according to claim 1 further comprising a cover slip.

12. An optical arrangement comprising:
    a first lens having a positive power and wherein the radius of curvature of the surface of said first lens proximate to an object plane is less than or approximately equal to the radius of curvature of the surface of said first lens distal to said object plane;
    a second lens having a negative power;
    a third lens having a positive power;
    a fourth lens having a negative power;
    a fifth lens having a positive power;
    a sixth lens having a positive power;
    a seventh lens having a positive power, and wherein the radius of curvature of the surface of said seventh lens proximate to said object plane is less than or approximately equal to the radius of curvature of the surface of said seventh lens distal to said object plane; and,
    an eighth lens element having at least one lens, said eighth lens element having a positive power,
    wherein the distance from said first lens to said second lens is sufficient to reduce a ray height of a light ray entering said second lens from the ray height of said light ray entering said first lens and wherein the distance from said fifth lens to said sixth lens is sufficient to increase said ray height of said light ray entering said sixth lens from the ray height of said light ray entering said first lens.

13. The optical arrangement according to claim 12 wherein said reduction in ray height is about 40%.

14. The optical arrangement according to claim 12 wherein said increase in ray height is less than or equal to about 200%.

15. The optical arrangement according to claim 12, wherein said first lens has a refractive index of at least about 1.55.

16. The optical arrangement according to claim 12 wherein the V-number of said second lens differs from the V-number of said third lens by at least about 30.

17. The optical arrangement according to claim 12, wherein said second lens is fixedly attached to said third lens.

18. The optical arrangement according to claim 12, wherein said fourth lens has a refractive index of at least about 1.55.

19. The optical arrangement according to claim 12, wherein the V-number of said fourth lens differs from the V-number of said fifth lens by at least about 30.

20. The optical arrangement according to claim 12, wherein said fourth lens is fixedly attached to said fifth lens.

21. The optical arrangement according to claim 12 wherein said eighth lens is a hyperhemispherical lens.

22. The optical arrangement according to claim 12 further comprising a cover slip.

* * * * *